Jan. 29, 1935.                G. G. SPENCER                1,989,468
                                 TORCH
                          Filed Dec. 20, 1929           3 Sheets-Sheet 1
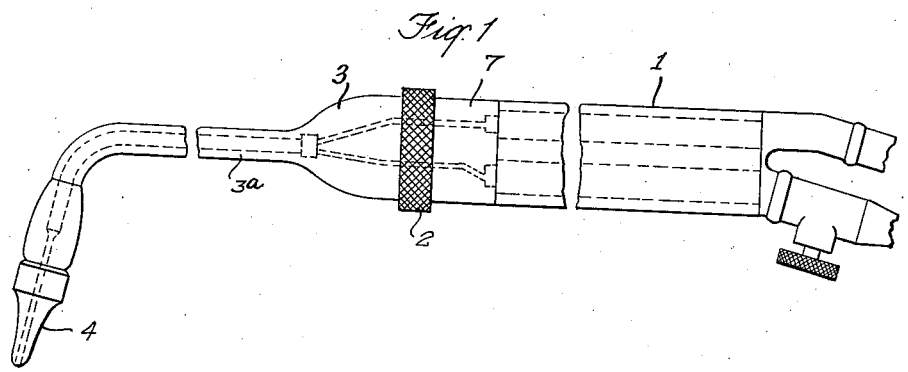
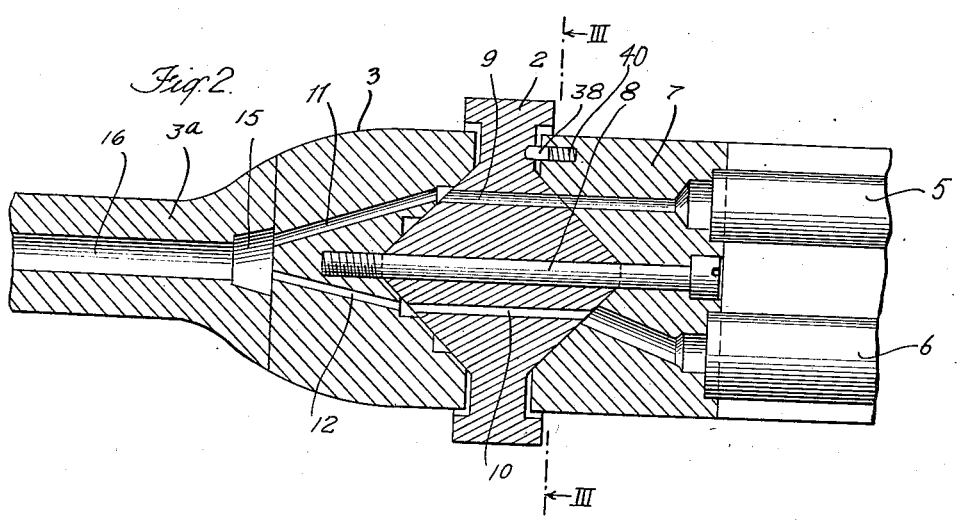
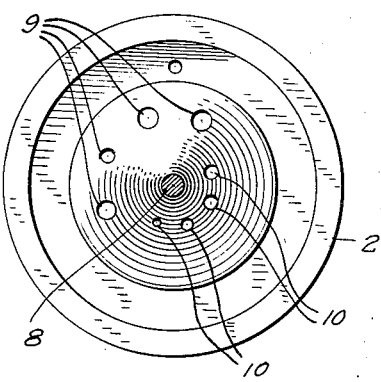

Jan. 29, 1935.                G. G. SPENCER                1,989,468
                                 TORCH
                          Filed Dec. 20, 1929         3 Sheets-Sheet 2
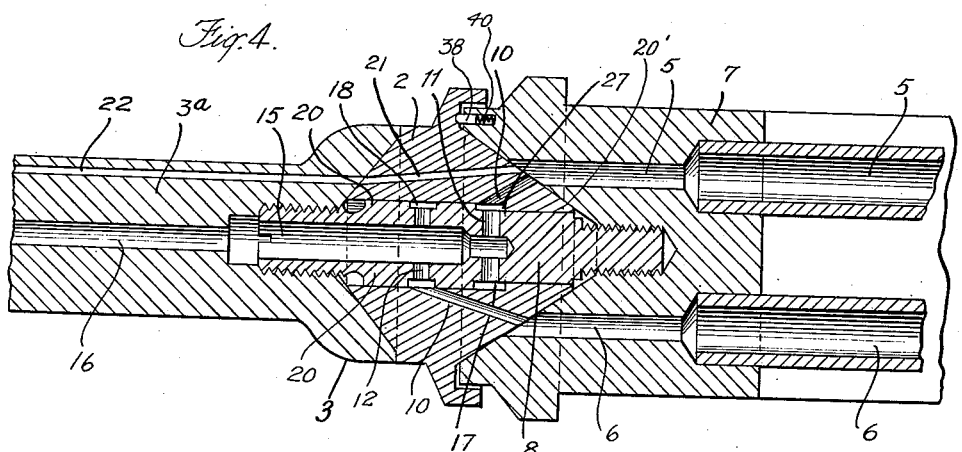
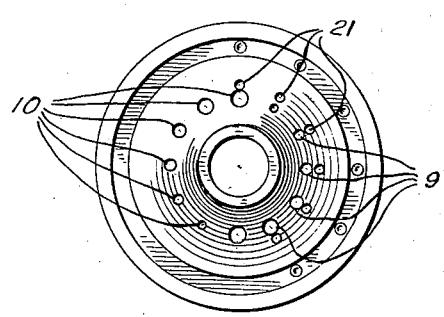
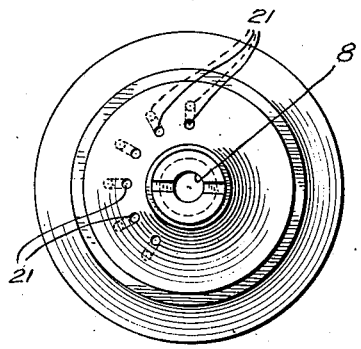
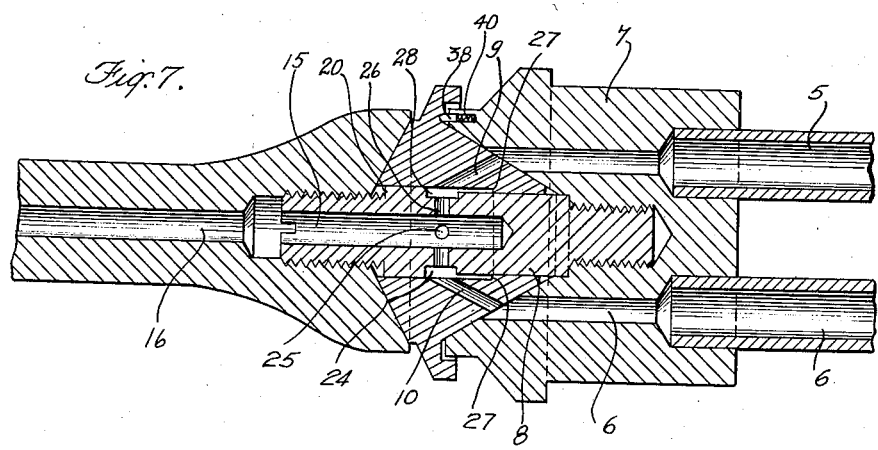
INVENTOR,
Gerald G. Spencer,
BY
Byrnes, Townsend & Brickenstein,
ATTORNEYS.

Jan. 29, 1935.  G. G. SPENCER  1,989,468
TORCH
Filed Dec. 20, 1929   3 Sheets-Sheet 3
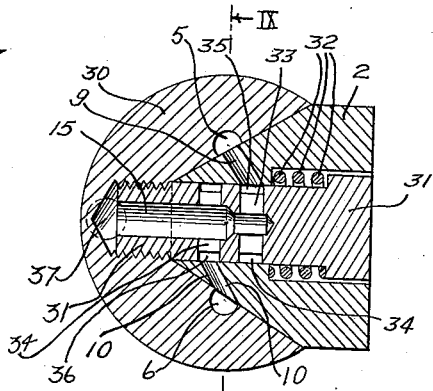
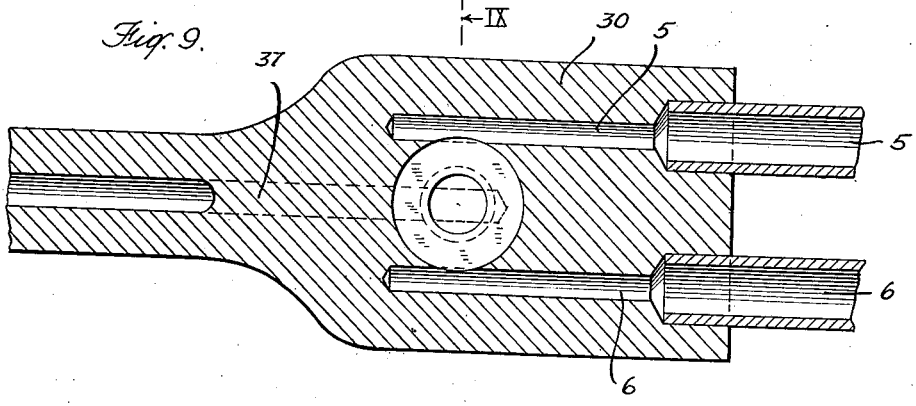
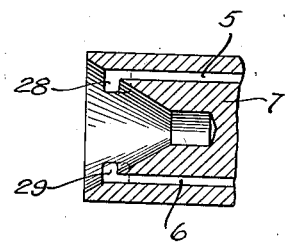
INVENTOR,
Gerald G. Spencer,
BY
Byrnes, Townsend & Crickenstein,
ATTORNEYS.

Patented Jan. 29, 1935

1,989,468

UNITED STATES PATENT OFFICE 1,989,468

TORCH

Gerald G. Spencer, Denver, Colo., assignor to Union Carbide and Carbon Research Laboratories, Inc., a corporation of New York Application December 20, 1929, Serial No. 415,497

15 Claims. (Cl. 158—27.4)

My invention relates to heating torches in which gases such as oxygen and acetylene are mixed in proper proportions and discharged through a nozzle to produce flames which may be used for welding, cutting and other purposes.

In the burning of mixed gases the character of the flame may be changed by varying the supply of gases to the mixer. In welding and cutting torches, the gases are combined in a mixing chamber in the torch. Different kinds of work require different quantities of mixed gas and different gas mixtures. Merely the change from a smaller to a larger torch-tip may require a different gas mixture to obtain the best results. Heretofore, these changes have been regulated either by varying the pressures of the gases supplied to the mixer when the tip was changed, or by replacing one tip-and mixer-unit for another unit of different tip and mixer proportions. The best mixtures are produced by a given mixer with only one combination of gas pressures. Therefore, the variations in the pressures of gases supplied to a given mixer to produce changes in volume of mixed gas did not give the best results. The operations necessary to change both the tips and the mixers were time consuming and required a number of spare-parts which made the torch equipment costly and cumbersome. The accuratey proportioned seating members of extra parts were exposed in the tool box when they were not in use and they were easily damaged. Special tools and great care were required to make the necessary changes.

It is one of the objects of my invention to provide a torch with a mixing chamber and a plurality of inlet passages for the gases so arranged that the character of the flame may be changed or adjusted to give a great variety of mixtures by means of a minimum number of simple motions without exchanging gas mixers or removing the gas mixer from the torch.

Other objects of my invention will appear in connection with the description of the drawings constituting a part hereof, in which Fig. 1 is a side elevational view of an assembled torch with portions shown broken away;

Fig. 2 is a longitudinal cross-sectional view of a portion of the torch shown in Fig. 1;

Fig. 3 is an end elevational view of the metering member or cone 2 which is shown in Fig. 2;

Fig. 4 is a partial longitudinal cross-sectional view of a torch showing one modification of my invention;

Fig. 5 is an end elevational view of one end of the metering member shown in Fig. 4;

Fig. 6 is an end elevational view of the opposite end of the metering member shown in Fig. 5;

Fig. 7 is a longitudinal cross-sectional view of another modification of my invention;

Fig. 8 is a transverse cross-sectional view of the torch head showing a modified form of metering member;

Fig. 9 is a partial longitudinal cross-sectional view of a torch handle taken along the line 9—9 of Fig. 8, and Fig. 10 is a partial longitudinal cross-sectional view of a torch handle showing modified gas passages.

The torch as shown in Figs. 1 and 2 consists, in general, of the following parts; a support or handle portion 1, a metering member in the nature of a mixing nozzle or valve 2, located at the forward end of the support or handle 1, a barrel portion 3 having a neck 3a extending forwardly therefrom and supporting a burner tip 4. Passages 5 and 6 respectively for conducting reaction gas, as oxygen and fuel gas from suitable sources of supply are properly positioned in the tubular handle 1 and terminated in the member 7 which is provided with induction or supply passages which are extensions of the supply passages in the pipes 5 and 6. The member 7 may be considered a faced portion, the forward face of which is countersunk, preferably conically, and the metering member 2 is provided with a conically faced portion fitted into the countersunk face. The end of the barrel 3 is likewise conically countersunk and another conical face of the metering member 2 is fitted thereto. It will be seen, therefore, that the metering member 2 is encased or partially encased by members 3 and 7. A bolt 8 extending through the member 7 and metering member 2 is screwed into the barrel portion 3 so as to prevent leakage of gas along the conical faces of the metering member. With proper care, the surfaces may be adjusted to permit the metering member 2 to be manually turned upon the bolt 8 as an axis without loosening the bolt 8, but for most practical purposes I prefer to draw the parts snugly together and to separate the parts, say about one-eighth of an inch when it is desired to turn the metering member 2 on the bolt as an axis.

As shown in Fig. 3, the metering member 2 is provided with groups of axially positioned bores 9 and 10, the bores of each group being arranged in series of progressively varying diameter and so that taken in pairs, one from each group, the pairs of bores may be brought seriatim simultaneously into registration at one end respectively with the fuel and oxygen gas supply or induction passages 5 and 6 and at the other end in registration with the oxygen and fuel gas delivery or eduction passages 11 and 12. The passages 11 and 12 lead to a mixing chamber 15 from which the mixture of gases is conducted to the tip 4 through a single gas mixture passage 16.

In the metering member 21 shown in Figs. 2 and 3, the bores of group 9 are spaced from the axis of the metering member on a circle of one diameter and the bores of group 10 on a circle of another diameter so that sufficient space will be provided between the bores to prevent liability of leakage from the bores of one group to those of another. Upon turning the metering member upon its axis, one pair of bores 9 and 10 will register with the oxygen and fuel gas supply and delivery passages or bores and permit the delivery of a predetermined volume and proportion of fuel gas and oxygen to the mixing chamber 15. It is not necessary to space the bores 9 and 10 on different diameters. The groups of bores 9 and 10 in Figs. 5, 7 and 8 are arranged in pairs of the above character upon the same diameters.

The character or size of the flame may be changed by providing bores 9 and 10 of different sizes, so as to permit various amounts or proportions of the gases to pass. The bores are carefully proportioned so as to pass the proper amounts of gases for combustion purposes with given sized tips, and so that upon turning the metering member first one pair of bores 9 and 10 which are proportioned to give one kind or volume of oxygen and fuel mixture, and then another pair which are proportioned to give another kind or volume of mixture, will register with the supply bores and with the delivery bores. Thus, the bores in the metering member may be proportioned so as to vary the proportion of the gases in the mixture, or the volume of the mixture, or both the volume of mixture and the proportion of gases in the mixture.

Figs. 4 and 7 show an arrangement in which the mixing chamber 15 is incorporated in the metering member assembly. Means are provided to mount the metering member so as to retain the member on the bolt 8 when the tip or a front-end member which carries the tip is removed. The cylindrical bolt 8 is threaded on both ends. The surface of the bolt 8 intermediate its ends is machined and fitted into a smooth longitudinal bore through the metering member 2 so that the metering member may be turned on an enlarged portion 20 of the bolt as an axis. Into the delivery end, the bolt is bored out to provide a mixing chamber 15. Annularly disposed grooves 17 and 18 are cut in the bolt so as to connect through bores 11 and 12 with the mixing chamber 15. Bores 9 and 10 are spaced in the metering member 2 and connect the pipes 5 and 6 with the delivery grooves, or passages, 17 and 18 respectively.

The double cone metering member 2 is given a smaller bore in the receiving end than in the delivery end so as to form an inward projection or shoulder 27. The rearward end of the bolt 8 is machined smaller than the front end so that a shoulder is formed to engage the shoulder 27. The engagement of these shoulders prevents the removal of the distributor when the bolt 8 is screwed into the member 7. The arrangement is convenient to retain the metering member on the member 7 whenever the front portion 3 is mounted or dismounted. If desired, the shoulder member 27 may be omitted, in which case the metering member could be dismounted with the front portion 3.

In assembling the modification of my invention shown in Figs. 4 and 7, the metering member is mounted on the bolt 8 and the bolt 8 is securely screwed into the member 7. The barrel member is screwed upon the projecting end of the bolt 8 against the metering member so as to prevent leakage of gas. If desired, washers, or packing of proper thickness may be used between the shoulders 20 and 20' of the bolt 8 and the parts 3 and 7 respectively, so as to permit a tight setting of the bolt without unduly jamming the conical faces of the metering member 2.

In a cutting torch a third series of bores 21 to conduct the cutting oxygen may be spaced in the metering member, as shown in Figs. 4, 5 and 6. The cutting oxygen bores 21 are adapted to form connection between the oxygen supply passage 5, and the oxygen passage 22 which extends to the torch tip. The bores 21 are spaced in the metering member 2 so that they will register with the bore 5 when the bores 9 and 10 form communications between the passages 5 and 6 and the mixing chamber. The oxygen bores 21 may be proportioned according to the amount of oxygen required for the tip or for the particular gas mixture that is delivered by the bores 9 and 10. In the arrangement shown in Figs. 4, 5 and 6 the bores 9 and 21 are on circles of the same radii but other arrangements of the bores may be made.

Fig. 7 illustrates a modification of my invention in which the mixing chamber 15 is incorporated in the bolt 8. In this modification a connected peripheral delivery groove or passage 28 for both oxygen and fuel gas is formed around the bolt 8. The bores 9 and 10 form communications from the supply pipes 5 and 6 to the groove 28 and passage 26 through the ports 25 to the mixing chamber 15. The metering member is mounted to turn on bolt 8 as an axis and is provided with a plurality of oxygen and fuel gas bores which may be brought into registry with the supply and delivery passages in the manner hereinbefore described.

Figs. 8 and 9 illustrate my invention as applied to a torch in which the metering member 2 may be mounted along the lateral surface of the torch. The metering member 2 may be mounted on the neck portion 30, or delivery member of the torch by means of a bolt 31 which is passed through the metering member 2 and securely screwed into the member 30. The metering member is fitted to a conical seat in the member 30 and a coil spring 32 between the head of bolt 31 and a countersunk opening in the external surface of the metering member serves to hold the metering member 2 on its conical seat and permit it to be turned thereon. Circumferential grooves or delivery passages 35 and 36 are cut in the bolt 31 and passages 33 and 34 communicate between the grooves 35 and 36 and the mixing chamber 15. A plurality of pairs of bores 9 and 10 are positioned in the cone 2 so that one pair of the bores will form passages between the grooves 35 and 36 and their corresponding supply pipes 5 and 6 when the member 2 is in a given position. By turning the member into other positions, other pairs of differently proportioned bores 9 and 10 change the flow of oxygen and fuel gas into the mixer. The mixing chamber 15 delivers the mixed gas to a passage 37 which leads to the burner tip. One advantage of this modification is that the metering member 2 can be mounted so as to be surrounded with cast metal and form a very substantial conical seat for the metering member 2.

Fig. 10 illustrates an arrangement which is capable of supplying and regulating large amounts of the gases as well as small amounts. The drawings show ports for regulating only the fuel gas and the burner oxygen in a welding torch, but it is evident that additional ports similarly arranged may be used in a cutting torch for the cutting oxygen. The bores 9 and 10 which are preferably of various diameters are arranged in the metering member to communicate with the mixing chamber as communication is established between the bores and the supply passages 5 and 6, as heretofore described. In the faced end of the supporting member 7, shown in Fig. 10, the grooves 28 and 29 corresponding to each of the series of bores 9 and 10 in the conical metering member are positioned so that one or more than one of the series of bores 9 and 10 will open into its corresponding groove as the metering member is turned. Thus, the grooves may be made long enough to include two or more bores of each of the series, 9 and 10. With longer grooves and a proper adjustment of the metering member, greater volumes of gases may be conducted by the metering member since a greater number of bores may be put into operation at the same time than with shorter grooves. The bores are placed in the metering member so that they will deliver gas to the mixing chamber as they are put in communication with the supply passages 5 and 6 or they may be in communication at all times at their delivery ends with the mixing chamber 15.

In order to indicate a proper alignment of the ports and passages when the metering member 2 is turned on its axis, an indexing arrangement is provided. One form of index may consist of properly located marks on the exterior peripheral edge of the conical metering member 2 to correspond to a mark on the barrel member 7. Another convenient indexing arrangement may be made by setting a small dowel pin 38 either in the member 7 or in the metering member 2 and locating small drilled holes in the face of the opposite member to fit the projecting end of the dowel pin as shown in Figs. 2, 4 and 7. By setting a spring 40 in back of the dowel pin and providing properly shaped shoulders on the drilled holes, the metering member may be turned without separating the members.

In illustrating my invention, I have shown conically formed metering member seats and have referred to the metering member as a conical member, but I do not limit myself to conically shaped members, since it is evident that other forms of seats may be used and such forms may vary the general shape of the metering member. Other modifications may be made without departing from my invention, and I wish to be limited only by the prior art and by the invention as defined in the annexed claims.

I claim as my invention:

1. A torch comprising a handle having longitudinal supply passages therein, a part having delivery passages therein and a member rotatably disposed between said handle and part, means for rotating said member, said member having spaced bores of various cross-sectional areas capable of aligning one at a time with a supply and with a delivery passage to form a communication therebetween when said member is displaced through a certain angle, and other bores correspondingly arranged so as to simultaneously connect other supply passages with other delivery passages.

2. A torch having a plurality of supply passages for gases, a member interrupting said passages rotatably secured to the torch and fitted to the torch so as to form gas-tight joints therewith, means for rotating said member, said member having bores of various cross-sectional areas therethrough that are capable of forming continuations of the supply passages when the member is in one position and other bores that are capable of forming continuations of the passages when the member is in another position, means to properly align the bores with the passages, a second member abutting said first mentioned member having a mixing chamber therein and passages which connect said mixing chamber and those bores forming continuations of said supply passages.

3. A torch comprising a handle having longitudinal supply passages therein, a barrel, a metering member rotatably disposed between said handle and barrel having surfaces adjoined and fitted between the handle and barrel, and a bolt member extending through the metering member and engaging said handle and barrel to hold the adjoining fitted surfaces together, said bolt member having a chamber for mixing gases and delivery passages corresponding in number to the supply passages leading thereto, means for rotating the metering member, said metering member having a plurality of series of bores, the bores in each series being of different sizes and upon selected movement of the metering device a bore of each series will provide communication between a supply and a delivery passage whereby the quantity and the quality of the gaseous mixture may be varied.

4. A torch comprising a supporting member having supply passages for communicating with separate supplies of gases, said support having a faced portion in which said passages terminate, a metering member seated on said faced portion, said metering member being rotatably secured to the supporting member and having a plurality of bores of various cross-sections arranged so that each of said passages will communicate with one end of a corresponding bore when the metering member is in one position and with another of said bores when the metering member is rotated into another position, means for rotating the metering member and a member having a single mixing chamber, said member having passages which connect the other ends of the active bores and said chamber.

5. A torch comprising a support having a faced portion, a metering member having a faced portion seated on said faced portion and having an axial bore therethrough, a cylindrical member fitted in said bore, means to attach the cylindrical member to the support, an internal projection in said longitudinal bore, an external projection on said cylindrical member for engaging the internal projection of the bore so as to rotatably retain the metering member on the cylindrical member and the support, another faced portion on the metering member, a barrel member seated on the other faced portion, and means on the cylindrical member to attach the barrel member thereto and form gas-tight joints between said faced members.

6. A torch having an oxygen passage, a fuel gas passage, a single gas mixture passage, and means to vary the volumes of the gases delivered to said mixture passage from said fuel gas and oxygen passages, said means comprising an adjustable valve having a group of various sized bores any one of which may be set in register with the outlet of said oxygen passage and another group of various sized bores a correlative one of which may be set in register with the outlet of said fuel gas passage, both groups of bores communicating with said mixture passage.

7. A torch comprising a metering member and means encasing said metering member, said metering member being movable with respect to the encasing means, means for moving the metering member, said encasing means having an oxygen supply passage and a fuel gas supply passage, a single mixing chamber in said encasing means, the metering member having a plurality of various sized bores arranged in pairs so that when one end of a bore of any one pair is placed in communication with one supply passage the corresponding end of the other bore of said pair is placed in communication with the other supply passage and the opposite end of each bore of said pair is placed in communication with said single mixing chamber.

8. A torch comprising a metering member and a means encasing said metering member, said encasing means having an oxygen supply passage and a fuel gas supply passage, a cutting oxygen delivery passage and a mixing chamber, said metering member being movably mounted in the encasing means and having a plurality of sets of various sized bores therethrough, each set comprising a cutting oxygen bore adapted to form a communication between the oxygen supply passage and the cutting oxygen delivery passage, a mixture oxygen bore adapted to form a communication between the oxygen supply passage and the mixing chamber, and a fuel gas bore adapted to form a communication between the fuel gas supply passage and the mixing chamber, and means to move said metering member to place any one set of the metering member bores in communication with the passage or mixing chamber it is adapted to communicate with in the encasing means.

9. A torch comprising a metering member and a two part encasing means for said metering member, a threaded axial bore in each part, said metering member having a central bore therethrough having a reduced counter bore at one end to provide an internal shoulder therein, a bolt having threads on each end thereof and an intermediate portion cooperating with said central bore in said metering member, to rotatably support the same a shoulder on said bolt adapted to cooperate with the shoulder in said central bore to retain the metering member on said bolt, and the threads on each end of said bolt cooperating with said threaded axial bores in said encasing means to hold the parts of the encasing means and the metering member in a unitary assembly.

10. A torch comprising a tip, a metering member having oppositely directed conical faces, encasing members therefor each having a conical depression snugly receiving one of said faces, said members with the metering member constituting a torch handle, a bolt securing said members together so as to permit rotation of the metering member, said encasing members each having gas passages therethrough and the metering member having a plurality of groups of bores of various cross-sectional areas therethrough adapted to align with and form connections between the passages in the encasing members.

11. A torch comprising a member having longitudinal fuel and reaction gas supply passages therein, a part having corresponding delivery passages therein, and a member rotatably disposed between said first member and part, means for rotating said second member, said second member having groups of spaced bores therethrough, the ratio of the cross-sectional areas of the bores in each group varying with respect to the ratio of the cross-sectional areas of the corresponding bores of other groups, whereby upon selective rotation of said second member, a desired group of bores may be aligned with said supply and delivery passages.

12. A torch comprising a member having a group of longitudinal fuel and oxygen passages therein, a part having a group of passages therethrough corresponding to the longitudinal group of passages in said member; a second member between the first member and said part movable relatively thereto and having groups of spaced bores therethrough arranged sequentially in groups, the bores of each group taken seriatim varying in their cross-sectional areas; and means for moving said second member whereby the groups of bores therein may be selectively moved into alignment with passages of the corresponding groups in both the first member and said part.

13. A torch comprising a tip and a handle for supporting the tip; said handle having a metering member positioned sufficiently from the tip to be substantially unaffected by the heat thereat; encasing members for the metering member between which the metering member is rotatably mounted; said encasing members each having a pair of gas passages therethrough and the metering member having a plurality of pairs of bores of various cross-sectional areas therethrough, each pair corresponding to a pair of the passages in each of the encasing members, means for moving the metering member relative to the encasing members whereby the passages of each pair in the metering member are adapted to selectively form connection between the passages of the corresponding pairs in said encasing members.

14. A torch comprising a handle having longitudinal supply delivery passages therein, a barrel having passages communicating with a torch tip, a metering member rotatably disposed between said handle and barrel having surfaces adjoined and fitting thereto, and a bolt member fitted to the metering member so as to permit rotation of said metering member, means for rotating the metering member, means in the bolt to engage the handle and barrel for holding the adjoining fitted surfaces together, said barrel having a chamber for mixing gases and delivery passages connecting thereto, and said metering member having a series of passages of various cross sectional areas capable of being connected one at a time between one of said delivery passages and one of the supply passages and another series of passages similarly arranged so that a corresponding passage simultaneously connects another delivery passage with another supply passage, said passages being proportioned to vary the quantity and quality of the mixture.

15. A torch comprising a metering member and two encasing members therefor, the encasing members having respectively groups of induction and eduction passages lengthwise thereof; said metering member being movable relative to the encasing members and having groups of bores therethrough corresponding to each of the groups of passages in the encasing members, the bores of each group in the metering member varying from each other in cross sectional areas whereby said groups of bores are movable selectively into alignment with passages corresponding thereto in the encasing members so as to selectively form connections between the induction and eduction passages.

GERALD G. SPENCER.